(12) United States Patent
Engelke et al.

(10) Patent No.: US 7,881,441 B2
(45) Date of Patent: Feb. 1, 2011

(54) DEVICE INDEPENDENT TEXT CAPTIONED TELEPHONE SERVICE

(75) Inventors: Robert M. Engelke, Madison, WI (US); Kevin R. Colwell, Middleton, WI (US); Troy D. Vitek, Wanakee, WI (US); Kurt M. Gritner, Madison, WI (US)

(73) Assignee: Ultratec, Inc., Madison, WI (US)

( * ) Notice: Subject to any disclaimer, the term of this patent is extended or adjusted under 35 U.S.C. 154(b) by 1303 days.

(21) Appl. No.: 11/391,141

(22) Filed: Mar. 28, 2006

(65) Prior Publication Data

US 2007/0036282 A1    Feb. 15, 2007

Related U.S. Application Data

(60) Provisional application No. 60/695,099, filed on Jun. 29, 2005.

(51) Int. Cl.
*H04M 11/00* (2006.01)
(52) U.S. Cl. .................... 379/52; 379/90.01
(58) Field of Classification Search .............. 379/52, 379/93.15, 93.07; 370/352
See application file for complete search history.

(56) References Cited

U.S. PATENT DOCUMENTS

| | | | |
|---|---|---|---|
| 3,372,246 A | 3/1968 | Knuepper |
| 3,507,997 A | 4/1970 | Weitbrecht |
| 3,515,814 A | 6/1970 | Morgan |
| 3,585,303 A | 6/1971 | Chieffo |
| 3,598,920 A | 8/1971 | Fischer |
| 3,800,089 A | 3/1974 | Reddick |
| 3,896,267 A | 7/1975 | Sachs |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel et al. |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |

(Continued)

FOREIGN PATENT DOCUMENTS

DE    2647097    4/1978

(Continued)

OTHER PUBLICATIONS

PCT Search Report PCT/US2006/025236.

(Continued)

*Primary Examiner*—Stella L Woo
(74) *Attorney, Agent, or Firm*—Quarles & Brady

(57) ABSTRACT

Text captioned telephony, in which a telephone conversation is accompanied by text captions to aid in hard-of-hearing users, is implemented without the use of specialized text captioned telephone terminals by using a combination of an Internet appliance such as a computer and a telephone or by generalized voice over Internet protocol (VOIP) telephones.

42 Claims, 5 Drawing Sheets

U.S. PATENT DOCUMENTS

| | | | |
|---|---|---|---|
| 4,302,629 A | 11/1981 | Foulkes et al. |
| 4,307,067 A | 12/1981 | Tagawa et al. |
| 4,307,266 A | 12/1981 | Messina |
| 4,354,252 A | 10/1982 | Lamb et al. |
| 4,415,065 A | 11/1983 | Sandstedt |
| 4,426,555 A | 1/1984 | Underkoffler |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin et al. |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan et al. |
| 4,713,808 A | 12/1987 | Gaskill et al. |
| 4,754,474 A | 6/1988 | Feinson |
| D296,894 S | 7/1988 | Chen |
| 4,777,469 A | 10/1988 | Engelke et al. |
| 4,799,254 A | 1/1989 | Dayton et al. |
| 4,817,135 A | 3/1989 | Winebaum |
| 4,839,919 A | 6/1989 | Borges et al. |
| 4,849,750 A | 7/1989 | Andros et al. |
| 4,868,860 A | 9/1989 | Andros et al. |
| 4,897,868 A | 1/1990 | Engelke et al. |
| D306,727 S | 3/1990 | Fritzsche |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| D322,785 S | 12/1991 | Wu |
| 5,081,673 A | 1/1992 | Engelke et al. |
| 5,086,453 A | 2/1992 | Senoo et al. |
| 5,091,906 A | 2/1992 | Reed et al. |
| 5,095,307 A | 3/1992 | Shimura et al. |
| 5,099,507 A | 3/1992 | Mukai et al. |
| 5,121,421 A | 6/1992 | Alheim |
| 5,128,980 A | 7/1992 | Choi |
| 5,134,633 A | 7/1992 | Werner |
| 5,163,081 A | 11/1992 | Wycherley et al. |
| 5,192,947 A | 3/1993 | Neustein |
| 5,210,689 A | 5/1993 | Baker et al. |
| 5,214,428 A | 5/1993 | Allen |
| 5,216,702 A | 6/1993 | Ramsden |
| 5,249,220 A | 9/1993 | Moskowitz et al. |
| 5,280,516 A | 1/1994 | Jang |
| 5,289,523 A | 2/1994 | Vasile et al. |
| 5,307,399 A | 4/1994 | Dai et al. |
| 5,311,516 A | 5/1994 | Kuznicki et al. |
| 5,325,417 A | 6/1994 | Engelke et al. |
| 5,327,479 A | 7/1994 | Engelke et al. |
| 5,339,358 A | 8/1994 | Danish et al. |
| 5,343,519 A | 8/1994 | Feldman |
| 5,351,288 A | 9/1994 | Engelke et al. |
| D351,185 S | 10/1994 | Matsuda et al. |
| 5,359,651 A | 10/1994 | Draganoff |
| 5,377,263 A | 12/1994 | Bazemore et al. |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,432,837 A | 7/1995 | Engelke et al. |
| 5,459,458 A | 10/1995 | Richardson et al. |
| D364,865 S | 12/1995 | Engelke et al. |
| 5,475,733 A | 12/1995 | Eisdorfer et al. |
| 5,487,671 A | 1/1996 | Shpiro et al. |
| 5,503,560 A | 4/1996 | Stentiford |
| 5,517,548 A | 5/1996 | Engelke et al. |
| 5,522,089 A | 5/1996 | Kikinis et al. |
| 5,574,784 A | 11/1996 | LaPadula et al. |
| 5,581,593 A | 12/1996 | Engelke et al. |
| 5,604,786 A | 2/1997 | Engelke et al. |
| D379,181 S | 5/1997 | Sawano |
| 5,680,443 A | 10/1997 | Kasday et al. |
| 5,701,338 A | 12/1997 | Leyen et al. |
| 5,710,806 A | 1/1998 | Lee et al. |
| 5,712,901 A | 1/1998 | Meermans et al. |
| 5,724,405 A | 3/1998 | Engelke et al. |
| 5,766,015 A | 6/1998 | Shpiro |
| 5,787,148 A | 7/1998 | August |
| 5,799,273 A | 8/1998 | Mitchell et al. |
| 5,809,112 A | 9/1998 | Ryan |
| 5,809,425 A | 9/1998 | Colwell et al. |
| 5,826,102 A | 10/1998 | Escobar et al. |
| 5,850,627 A | 12/1998 | Gould et al. |
| D405,793 S | 2/1999 | Engelke et al. |
| 5,870,709 A | 2/1999 | Bernstein |
| 5,905,476 A | 5/1999 | McLaughlin et al. |
| 5,909,482 A | 6/1999 | Engelke |
| 5,974,116 A | 10/1999 | Engelke et al. |
| 5,978,654 A | 11/1999 | Colwell et al. |
| 5,991,723 A | 11/1999 | Duffin |
| 5,995,590 A | 11/1999 | Brunet et al. |
| 6,075,534 A | 6/2000 | VanBuskirk et al. |
| 6,075,841 A | 6/2000 | Engelke et al. |
| 6,075,842 A | 6/2000 | Engelke et al. |
| 6,175,819 B1 | 1/2001 | Van Alstine |
| 6,188,429 B1 | 2/2001 | Martin et al. |
| 6,233,314 B1 | 5/2001 | Engelke |
| 6,307,921 B1 | 10/2001 | Engelke et al. |
| 6,314,396 B1 | 11/2001 | Monkowski |
| 6,324,507 B1 | 11/2001 | Lewis et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 | 8/2003 | Engelke |
| 6,748,053 B2 | 6/2004 | Engelke et al. |
| 6,763,089 B2 | 7/2004 | Feigenbaum |
| 6,816,468 B1 * | 11/2004 | Cruickshank ............... 370/352 |
| 6,885,731 B2 | 4/2005 | Engelke et al. |
| 6,934,366 B2 | 8/2005 | Engelke et al. |
| 7,003,082 B2 | 2/2006 | Engelke et al. |
| 7,006,604 B2 | 2/2006 | Engelke |
| 7,142,642 B2 | 11/2006 | McClelland et al. |
| 7,142,643 B2 | 11/2006 | Brooksby |
| 7,164,753 B2 | 1/2007 | Engelke et al. |
| 7,233,655 B2 * | 6/2007 | Gailey et al. ................. 379/52 |
| 7,313,231 B2 * | 12/2007 | Reid .......................... 370/352 |
| 7,315,612 B2 | 1/2008 | McClelland |
| 2004/0083105 A1 | 4/2004 | Jaroker |
| 2005/0183109 A1 * | 8/2005 | Basson et al. ................. 725/4 |
| 2005/0226394 A1 | 10/2005 | Engelke et al. |
| 2005/0226398 A1 | 10/2005 | Bojeun |
| 2006/0140354 A1 | 6/2006 | Engelke |
| 2006/0285652 A1 * | 12/2006 | McClelland et al. .......... 379/52 |
| 2008/0152093 A1 | 6/2008 | Engelke et al. |

| | | | |
|---|---|---|---|
| 2008/0187108 A1 | 8/2008 | Engelke et al. | |

FOREIGN PATENT DOCUMENTS

| | | |
|---|---|---|
| DE | 2749923 | 5/1979 |
| DE | 3410619 | 10/1985 |
| DE | 3632233 | 4/1988 |
| DE | 103 28 884 A1 | 2/2005 |
| EP | 0029246 | 5/1981 |
| EP | 1330046 | 7/2003 |
| FR | 2403697 | 4/1979 |
| FR | 2432805 | 2/1980 |
| FR | 2538978 | 7/1984 |
| GB | 2183880 | 6/1987 |
| GB | 2335109 | 9/1999 |
| GB | 2339363 | 1/2000 |
| JP | 55-044283 | 3/1980 |
| JP | 57-055649 | 4/1982 |
| JP | 58-134568 | 8/1983 |
| JP | 60-259058 | 12/1985 |
| JP | 63-198466 | 8/1988 |
| WO | PCT/US93/04760 | 11/1993 |
| WO | PCT/US95/00015 | 7/1995 |
| WO | 2005/081511 A1 | 9/2005 |

OTHER PUBLICATIONS

PCT/US2009/040523 Search Report and Written Opinion; 14 pages.

Radio Electronics, Mar. 1976, pp. 51-58, "ASCII to Baudot" Smith, Roger L.

R.J. Cooper, "Break feature for half-duplex modem", IBM Technical Disclosure Bulletin, vol. 17, No. 8, pp. 2386-2387 Jan. 1975.

Gopalakrishnan, "Effective Set-up for Performing Phone Conversations by the Hearing Impaired", IBM Technical Disclosure Bulletin, pp. 423-426, (Dec. 1991).

Moskowitz, J., "Telocator Alphanumeric Protocol", Version 1.8, Jan. 1997.

AU Pat. App. No. 2006263680, Amendment, Jun. 17, 2010.

AU Pat. App. No. 2006263680, Examination Report, Jun. 29, 2009.

EP Pat. App. No. 06785768.0, Communication, Aug. 9, 2010.

* cited by examiner

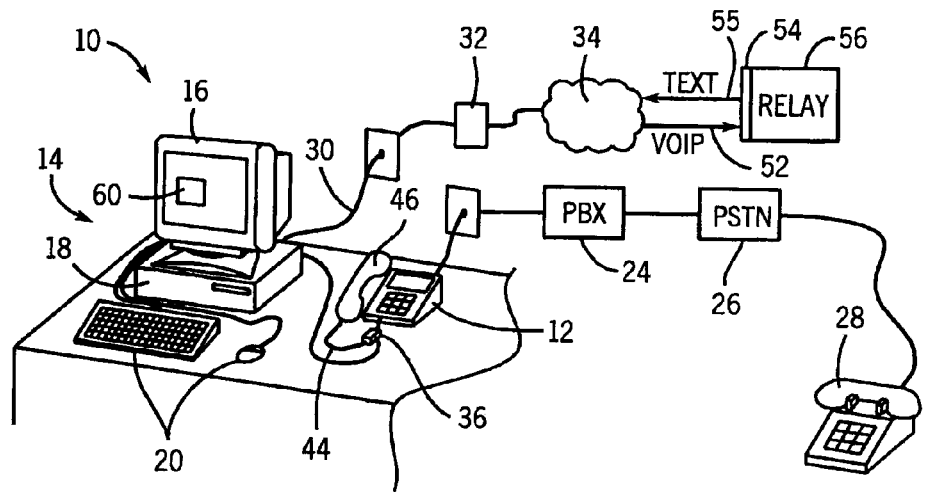
FIG. 1
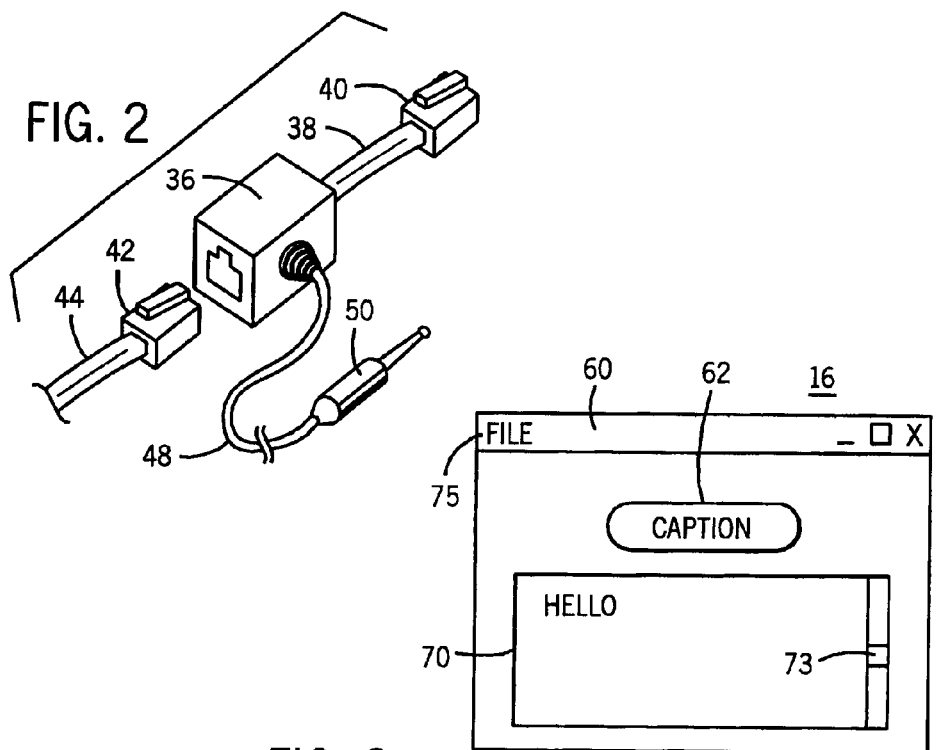
FIG. 2
FIG. 3

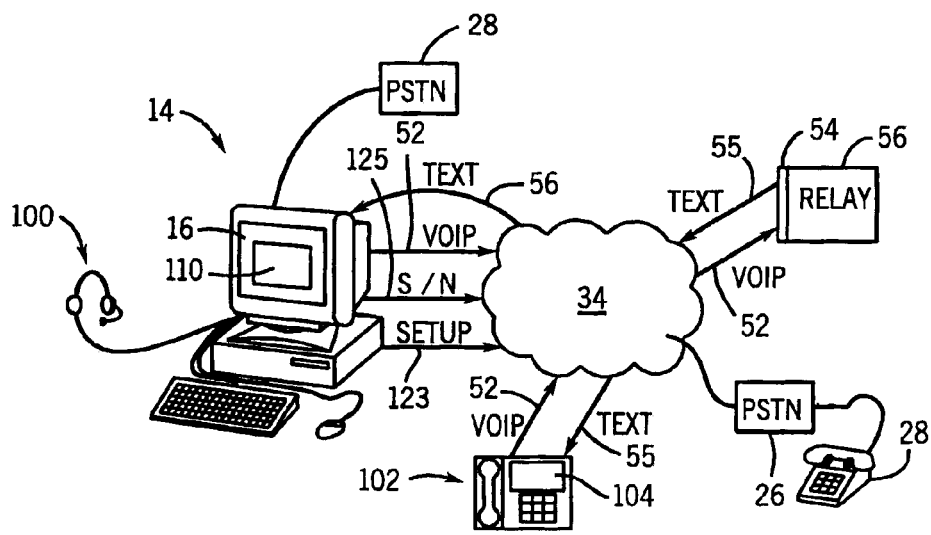
FIG. 8
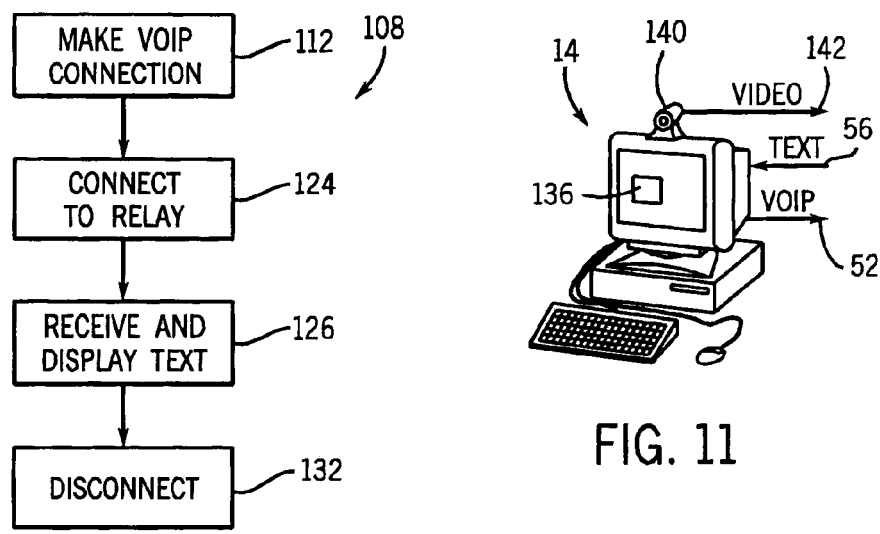
FIG. 10
FIG. 11

DEVICE INDEPENDENT TEXT CAPTIONED TELEPHONE SERVICE

CROSS-REFERENCE TO RELATED APPLICATIONS

This Application claims the benefit of U.S. Provisional Application 60/695,099 filed Jun. 29, 2005, and hereby incorporated by reference.

STATEMENT REGARDING FEDERALLY SPONSORED RESEARCH OR DEVELOPMENT

- - -

BACKGROUND OF THE INVENTION

The present application relates generally to telephone systems and specifically to telephone systems that provide for real-time text captioning for the hard of hearing.

Modem telecommunication services provide features to assist those who are deaf or hard of hearing. One such feature is the text telephone (TTY) also known as a telecommunication device for the deaf (TDD). TDDs allow for text communication through the telephone system by generating tones that may be transmitted by analog telephone lines in response to a user typing letters on a keyboard.

Hearing users may communicate with deaf users who have TDD devices through so-called "relays." A relay is a service funded by telephone communication surcharges that provides a "call assistant" who intermediates between a deaf user and a hearing user. The call assistant communicates with the deaf user using a TDD and communicates with the hearing user by voice over a standard telephone line.

A relay service may also be used to help those who are not deaf, but hard of hearing, by providing a captioned telephone. With a captioned telephone, a user who is hard of hearing may carry on a normal telephone conversation with a hearing user while a text transcription of the words spoken by the hearing user is displayed on the telephone. The text transcription allows the hard of hearing user to confirm his or her understanding of the spoken words. Unlike with a conventional relay service, captioned telephone requires extremely fast text transcription using a computer executed voice recognition system (typically with revoicing by a trained operator) so that the text captioning is as nearly as possible contemporaneous with the spoken words.

Text captioned telephones of this type are marketed under the service mark CAPTEL and described in U.S. Pat. Nos. 6,307,921 and 6,075,842 assigned to the assignee of the present invention and hereby incorporated by reference.

A text captioned telephone system employs a relay service in a mode where the relay transmits both the voice of the hearing user and a text stream of the spoken words by that user. A telephone of the receiving hard of hearing user provides a text display for displaying the captions.

In a single-line text captioned telephone, text and voice signals may be received over a single telephone line and separated electronically. The text captioned telephone includes software that automatically dials the relay, and providing the relay with the telephone number of the ultimate destination of the call. For incoming telephone calls, the hard of hearing user must normally hang up and redial the caller through the relay.

In a two-line text captioned telephone, a first telephone line communicates with the caller, and a second telephone line communicates exclusively with the relay. The two-line system allows text captioning to be easily used on incoming calls by allowing the text captioned telephone to dial out to the relay when the call is received and forward the necessary voice signal.

Many users of text-captioned telephony have jobs requiring significant use of the telephone as made possible by text-captioning. These users face a significant problem when they need to make use of telephone systems outside of their normal work environment where text captioning telephones may not be available or equipment such as cellular telephones that does not support text captioning must be used. Many workplaces use proprietary private branch exchange (PBX) telephone lines that do not support analog text captioning telephones, the latter which require standard telephone connections.

SUMMARY OF THE INVENTION

The present inventors have recognized that increased accessibility of workers to the Internet and general purpose computers makes it possible to provide text-captioned telephony independently of specialized telephone terminal hardware intended narrowly for the deaf, hard of hearing, or assisted users. In a first embodiment, a standard telephone may be used in tandem with an Internet-connected computer to allow the conversation on the telephone to be augmented with text displayed on the computer. The voice signal is provided to a captioning service which transmits text captions over the Internet to the computer in near real time. In this way, standard office equipment can provide text-captioning capabilities without the need for specialized telephone equipment.

Specifically, in a first embodiment of the invention, text captioning is provided to callers by a combination of a telephone terminal and an Internet appliance such as a browser on a computer. A first caller communicates a voice portion of a telephone call over the telephone network with a second caller, both callers operating telephone terminals on telephone lines. Text transcribing the telephone call is communicated over the Internet to one of the first and second callers for display on the Internet appliance.

Thus it is one object of at least one embodiment of the invention to use commonly available office equipment to provide text-captioned telephony.

It is another object of at least one embodiment of the invention to permit text-captioned telephony using available telephone equipment, telephone networks, and billing arrangements.

The telephone network may include a PBX network.

Thus it is an object of at least one embodiment of the invention to allow users of PBX phones to participate in the benefits of text-captioned telephony normally limited to standard telephone lines.

The text may be provided by a relay communicating with the Internet.

It is thus another object of at least one embodiment of the invention to allow existing relay services to be used without the need to navigate proprietary calling systems such as PBX or cellular telephone.

The relay may receive a portion of the telephone call from the telephone network.

Thus it is an object of at least one embodiment of the invention to present an embodiment in which high speed Internet is not required.

The first caller may dial the relay on the telephone network to provide the relay with the telephone number of the second caller, and the relay may call the telephone number of the second caller to complete the call.

Thus it is another object of at least one embodiment of the invention to preserve the anonymity or invisibility of the relay in the calling process.

The relay may alternatively receive a portion of the telephone call from the Internet in a voice over Internet protocol.

It is thus another object of at least one embodiment of the invention to eliminate the need for a separate call to the relay allowing seamless handling of incoming calls as well as the ability to make outgoing calls.

The portion of the telephone call may be provided by tapping into the handset of one telephone terminal to communicate a portion of the conversation to the Internet appliance.

It is thus another object of at least one embodiment of the invention to provide a wide variety of telephone terminals to be used, with which the user is convenient and familiar, while providing a signal to the Internet appliance without the need for cumbersome or specialized microphones and the like.

The Internet appliance may further transmit a video signal to the user over the Internet.

Thus it is another object of at least one embodiment of the invention to take advantage of the Internet connection to provide augmented communication between the callers or a caller and the relay.

In an alternative embodiment, the invention may provide for text captions to telephone calls by communicating a voice portion of the telephone call between the first caller and the second caller over an Internet telephone using voice over Internet protocol (VOIP). Text captioning of the telephone call can be provided by a relay tapping into the Internet transmission and forwarding captioning information to the Internet telephone also over the Internet.

Thus it is an object of at least one embodiment of the invention to take advantage of the ability of the Internet to make multiple connections among more than one party (e.g., two callers and the relay) to provide text-captioned telephony. It is another object of at least one embodiment of the invention to take advantage of the ubiquity of Internet connections in the office environment to avoid the problems normally inherent in PBX proprietary lines.

The Internet telephone may be a computer communicating with the Internet or a dedicated VOIP telephone where the captioning is displayed on the VOIP telephone display.

Thus it is another object of at least one embodiment of the invention to take advantage of inherent text communication qualities of VOIP telephone systems, either those using computers or dedicated VOIP phones, to provide for text-captioned telephony without specialized equipment.

The user may initiate the communication to the relay to promote text captioning.

Thus it is an object of at least one embodiment of the invention to allow on-demand text captioning only as required.

The device may provide for a volume display to one of the first and second users.

Thus it is an object of at least one embodiment of the invention to allow the hard-of-hearing user to have an additional dimension of understanding of the conversation, and thus some assurance that proper text captioning is occurring.

The Internet telephone may incorporate a serial number and may use the serial number to validate the user.

It is thus another object of at least one embodiment of the invention to prevent misuse of relay services as may occur with the anonymity of the Internet.

The Internet telephone may further include a telephone network connection and the telephone may use the telephone network in lieu of the Internet when a telephone number is an emergency number such as 911.

Thus it is another object of at least one embodiment of the invention to provide a system that allows for traditional 911 response.

These particular objects and advantages may apply to only some embodiments falling within the claims and thus do not define the scope of the invention.

BRIEF DESCRIPTION OF THE DRAWINGS

FIG. 1 is a representation of a first embodiment of the invention providing text-captioned telephony using a PBX office telephone and Internet-connected computer;

FIG. 2 is a perspective view of a voice-tap connecting the PBX telephone of FIG. 1 to the computer to allow transfer of voice signals over the Internet to a relay;

FIG. 3 is a caller interface window as may be displayed on the computer of FIG. 1 allowing on-demand captioning of the telephone call;

FIG. 8 is a figure similar to that of FIGS. 1 and 5 showing implementation of a text-captioning using VOIP transmissions;

FIG. 10 is a flowchart of the principal steps executed by the computer in implementing the text-captioned telephony using VOIP telephones;

FIG. 11 is a fragmentary view of the computer of FIG. 8 showing the addition of a video camera so that voice and video may be transmitted to the other caller.

DETAILED DESCRIPTION OF THE PREFERRED EMBODIMENT

Figure 4:
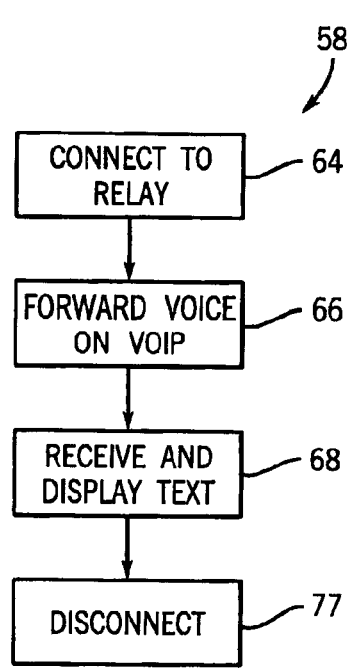
FIG. 4 is a flowchart of the principle steps of a program executed on the computer of FIG. 1 when captioning is demanded by the caller.

Referring to FIG. 1, in a first embodiment of the invention, a text captioned telephone system 10 may be implemented within a typical office having a PBX telephone terminal 12 and a desk top computer 14. The desk top computer 14 includes a display screen 16, a base unit 18 (including a processor, memory, disk drives and importantly a sound card) and a keyboard or other entry device 20.

As is understood in the art, the PBX telephone terminal 12 may be connected through an office wall jack 22 to a PBX network 24 using a proprietary communication protocol. The PBX network 24 communicates with a public switched telephone network 26 that allows the PBX telephone terminal 12 to connect to an external telephone terminal 28 to originate a call to the external telephone terminal 28 or to receive a call from the external telephone terminal 28.

The computer 14 may connect through an Ethernet card to an Ethernet network 30, passing to a local router 32 to connect to the Internet 34 or may use one of a number of well known wireless standards to connect to the local router 32.

Referring now also to FIG. 2, a voice signal tap 36 has a short cable stub 38 terminating in an RJ-12 jack 40 that may be received in the handset jack for the main body of the PBX telephone terminal 12. The tap 36 also provides a receiving socket for the RJ-12 jack 42 associated with the handset cord 44 so that the tap 36 may be simply interposed between the handset 46 and the main body of the PBX telephone terminal 12 to conduct voice signals as analog audio signals therethrough.

A tap line 48 extending from the tap 36 terminates in a subminiature telephone jack 50 that may be received by audio input of the sound card of the base unit 18. The tap line conducts a portion of the voice signals from the handset 46 to the sound card of the base unit 18.

The voice signals received by the computer 14 may be processed by an internal program of a type well known in the art to encode the voice signals as VOIP signals 52 that may be sent over the Internet to a server 54 associated with a relay service 56. Programs for transmitting VOIP signal are commercially available from Skype of Luxembourg and Vonage of N.J., USA. At the relay service 56, the encoded voice signals may be converted back to an analog signal for transcription by a call assistant who produces corresponding captioning text 55 that may be relayed through conventional Internet transfer protocols back to the computer 14 where the text may be displayed.

In an alternative embodiment, a headset microphone and earpiece (not shown) may communicate separately with left and right sound card channels. This, along with echo canceling software in the computer 14 allows the relay service 56 to separate the voice of the caption user from the other party for improved transcription and anonymity.

The relay service 56 may provide for human operators working with speech recognition engines to rapidly translate voice signals into text streams. The operation of such a relay is described in more detail in U.S. Pat. No. 6,567,503, assigned to the same assignee as the present invention and hereby incorporated by reference.

By placing the tap 36 in the path of the handset 46, analog audio signals may be obtained, greatly simplifying the acquisition of the audio signal without the need to contend with the PBX standard or the need or awkward or unfamiliar computer associated microphones.

Referring now to FIG. 3, an office user wishing to avail themselves of text captioning may start a text-captioning program 58 on the computer 14 to provide a caller interface window 60 on the display screen 16. The caller interface window 60 may provide simple mouse or keyboard operated controls including a caption button 62 that may be actuated by the caller to begin the program's operation.

Referring to FIG. 4, upon pressing of the caption button 62, as indicated by process block 64, the computer 14 may initiate an Internet connection to the relay service 56 by invoking a stored URL of the relay server 54. At this time, the computer 14 may provide some information to the relay including a serial number of the caller to validate the caller's location for the purpose of identifying the particular public authority responsible for the relay call. The caller can be required to register the program with a relay service database and the serial number can be used to authorize their use of the service, thus limiting fraudulent use of the relay service and allowing for local 911 service by providing information about the geographic location of the user.

As indicated by process block 66, the program 58 may then forward the tapped voice signals as VOIP signals to the relay server 54, and receive text as indicated by process block 68 which may be displayed in text box 70 of the caller interface window 60. The text box 70 includes conventional scroll-type controls 73 allowing text to be reviewed after it has been received. The program 58 may also provide for normal file operations 75 including saving of text files, e-mailing text files, and the like.

Upon completion of the call, the caller may press the caption button 62 again to disconnect the call as indicated by process block 71. The caption button 62 may include an animation visually indicating its state as being depressed or released or may change its label from "caption" to "end caption" indicating its changing function.

Importantly, this system allows for convenient and intuitive voice communication between a PBX telephone terminal 12 and telephone terminal 28, either for making outgoing calls or ingoing calls, while allowing either type of call to be captioned on demand without interruption of the telephone call or the need for specialized telephone equipment. This system will also work without a PBX exchange and can work for a variety of different telephone types not intended for text captioning.

Figure 5:
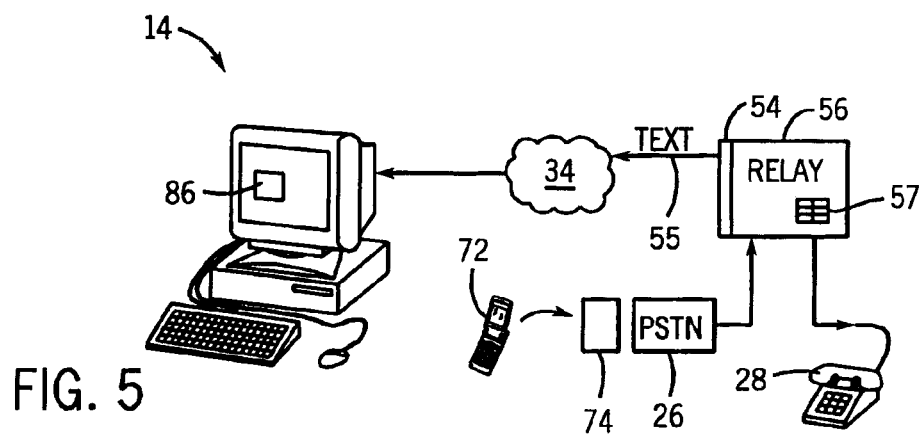
FIG. 5 is a figure similar to that of FIG. 1, showing an alternative embodiment in which the voice signal is routed through a standard telephone line to the relay and the text is returned to the computer.

Referring now to FIG. 5, in a second embodiment, a standard desk top computer 14 may work in conjunction with a standard telephone (i.e., not text captioned), in this case a cell telephone 72, the latter of which communicates through a cellular service 74 with the public switched telephone network 26, without a direct connection between the cell telephone 72 and the computer 14.

Figure 6:
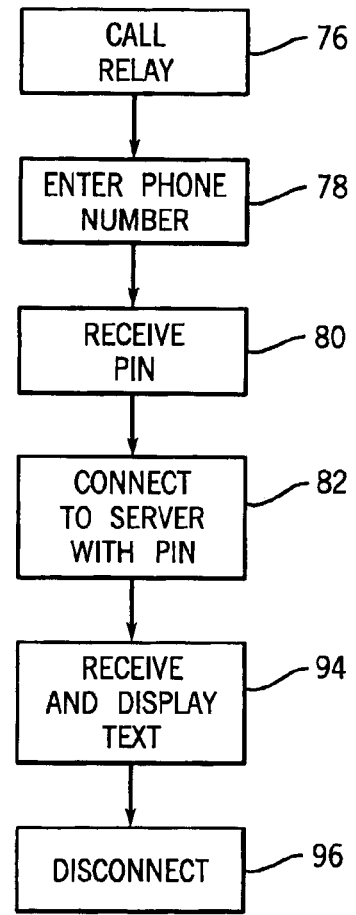
FIG. 6 is a figure similar to that of FIG. 4 showing the flowchart for the embodiment of FIG. 5.

In this embodiment, the caller using the cell telephone 72 first calls the relay service 56 as indicated by process block 76 of FIG. 6. The relay service 56, per standard practice, receives telephone calls over the public switched telephone network 26. The relay service 56 may provide an automated answering system that requests a telephone number from the caller of the ultimate destination of the telephone call, in this case, telephone terminal 28. As indicated by process block 78 of FIG. 6, the caller may enter the requested telephone number by using the caller's keypad on the cell telephone 72.

In the case where the relay service remains anonymous, in the sense that the call assistant does not speak directly with the caller, the answering system may provide the caller with a personal identification number (PIN) as indicated in process block 80. The relay service 56 links the caller's particular incoming line to the PIN in an internal database 57.

The caller, using a conventional browser on the desk top computer 14, then enters the URL of the server 54 of the relay service 56, as indicated by process block 82 of FIG. 6. This may also be done before initiating the call to the relay service 56.

Figure 7:
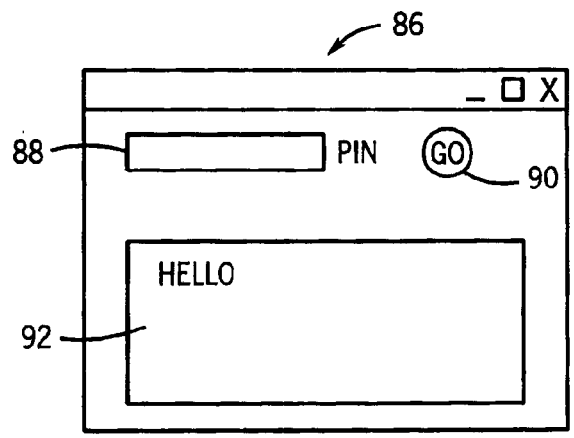
FIG. 7 is a figure similar to that of FIG. 3 showing a caller interface window for entering a PIN number to link captioning text to a particular call.

As shown in FIG. 7, the relay server 54 provides the caller with webpage 86 offering a text box 88 allowing entry of the PIN received at process block 80. The caller, by entering that PIN and press a captioning initiation button 90, causes the relay service 56 to complete the call by connecting the incoming audio from the cell telephone 72 to the telephone terminal 28. The relay service 56 then forwards captioning text 55 over the Internet 34 to the caller through a text box 92 as indicated by process block 94. The text box 92 may use, for example, a browser plug-in or instant messaging program to provide for a consistent updating of the text as it is received, but otherwise requires no specialized software on computer 14.

Alternatively and preferably, the caller may first contact the webpage 86 using the computer 14 to provide the relay server 54 with both the number the caller wishes to dial and also the caller's own telephone number. The relay server 54 then calls the caller over the cell phone 72. Once a connection is established with captions, the relay server 54 dials to the other party. This automatically links the IP address to the telephone connections without the need for PIN. The phone number of the caller may be entered on the webpage 86 in text box 87 and the destination phone number may be entered in text box 89 similar to those described for the PIN.

The use of a web page and browser plug in to avoid the need for specialized software to be on the desktop computer 14 is also applicable to the earlier embodiment of FIG. 1.

At the end of the call as indicated by process block 96, the caller may press the captioning initiation button 90 again to terminate the call. The captioning initiation button 90 may reflect this new purpose, of terminating the captioning, by changing its label.

Again, in this embodiment, no specialized text captioning equipment is required, but the system makes use of commonly available office and telephone equipment to provide for text captioning that is not limited to a particular location, but which may be used in any location where Internet and telephone access may be had. In this regard, computer 14 may, for example, be any Internet appliance, for example, a wireless mobile laptop or the like. Thus a caller may work from a hot spot using a cell telephone and a wireless laptop to obtain competent text captioning.

In a variation on this embodiment, set-up of the call (e.g. providing the relay service 56 with the destination phone number) may be accomplished using the desktop computer 14 rather than via telephone 72. When the caller calls the relay service 56, the caller enters a pin number to connect the call to the captioning or the connection may be made by linking the callers phone number with a number previously entered on the computer 14.

In this embodiment, identification of the particular governmental entity responsible for reimbursement for the captioning can be obtained from the information of the public switched telephone network 26 per standard practice.

In a variation on this embodiment, new 3G cellular services allow the use of both cellular voice and data connections simultaneously using a cellular phone. In this case, the browser on a desktop computer 14 may be replaced with a browser on the cell phone which provides a telephone and Internet appliance, all in one.

Referring now to FIG. 8 in a third embodiment, a single advanced Internet appliance may be used to replace the need for a telephone. That Internet appliance, for example, may be a standard computer 14 equipped with a microphone and headphone assembly 100 for making VOIP calls or a VOIP telephone 102 providing for display capabilities on screen 104. Many PBX systems now allow for the connection of VOIP phones.

Figure 9:
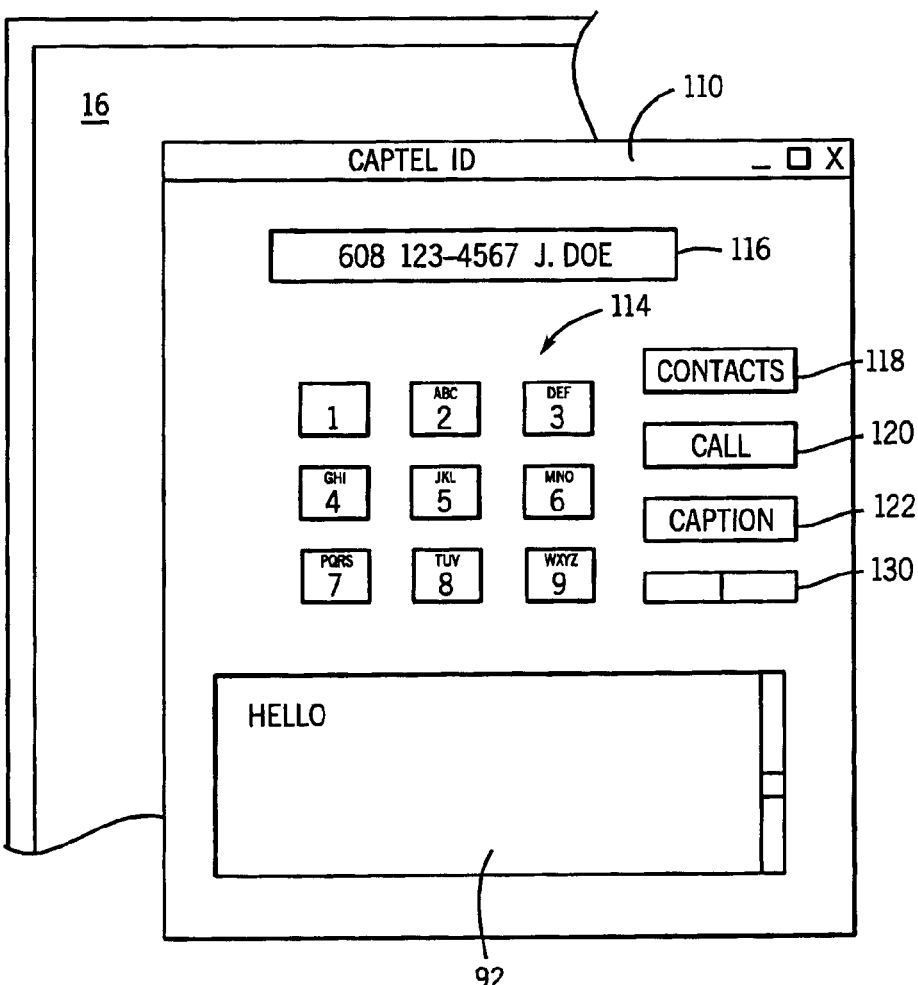
FIG. 9 is a figure similar to that of FIGS. 7 and 3 showing a caller interface window for a VOIP telephone implemented on a standard computer.

Referring also to FIGS. 9 and 10, in a first variation on this embodiment, a program 108 executed by the computer 14 provides a caller interface window 110 on the display screen 16 of the computer allowing the initiation of a VOIP connection as indicated by process block 112 of FIG. 10. The caller interface window 110 provides a standard virtual telephone keypad 114 by which a telephone number of a telephone terminal 28 on the public switched telephone network 26 may be entered and displayed in text box 116. Pressing of a call button 120 initiates a VOIP telephone call. The basic process of initiating a VOIP call is well understood in the art.

In the present invention, however, at any time, a captioning initiation button 122 may be pressed, causing initiation of a second VOIP telephone call directly to the relay service 56 through the relay server 54 as indicated by process block 124.

At this time, the VOIP signals 52 exchanged between the computer 14 and telephone terminal 28 (optionally via the public switched telephone network 26) may be multicast to the server 54 to be interpreted as voice signals by the relay service 56. The server 54 may also receive a serial number 125 identifying the caller and assisting in allocation of relay service fees among governmental entities. The relay service 56 returns captioning text 55 transcribing the VOIP signals 52 back to the computer 14 to be displayed in text box 92 as indicated by process block 126.

The caller interface window 110 may also provide a volume meter 130 aiding the caller in speaking to obtain sufficient signal strength for proper relay interpretation.

Alternatively, the call may be initiated as a captioned call by pressing the captioning initiation button 122, then dialing the telephone number, in which case, setup information 123 (e.g., the destination telephone number) together with a serial number 125, are forwarded to the relay service 56 which may then initiate the VOIP call to the telephone terminal 28 patching through signals received from computer 14 to the telephone terminal 28.

As indicated by process block 132, the call may be terminated by pressing the call button 120 and/or captioning may be terminated by pressing the captioning initiation button 122.

When the computer 14 is used, a connection to the public switched telephone network 26 may also be provided for interception of emergency calls, for example, to 911, routing those through the publicly-switched telephone network rather than through the Internet so as to provide for the benefits of rapid identification of geographic location of the caller inherent in calls made through the publicly-switched telephone network and not always provided currently with the VOIP services.

Referring again to FIG. 8, the identical steps may be accomplished by a specially programmed VOIP telephone 102, which requires only a modification in software to implement the same functions as those described above. The captioning initiation button in this case can be implemented in software keystroke combinations without the need for additional switches with the standard screen 104 on the VOIP telephone serving as the text display and optional volume meter.

Figure 12:
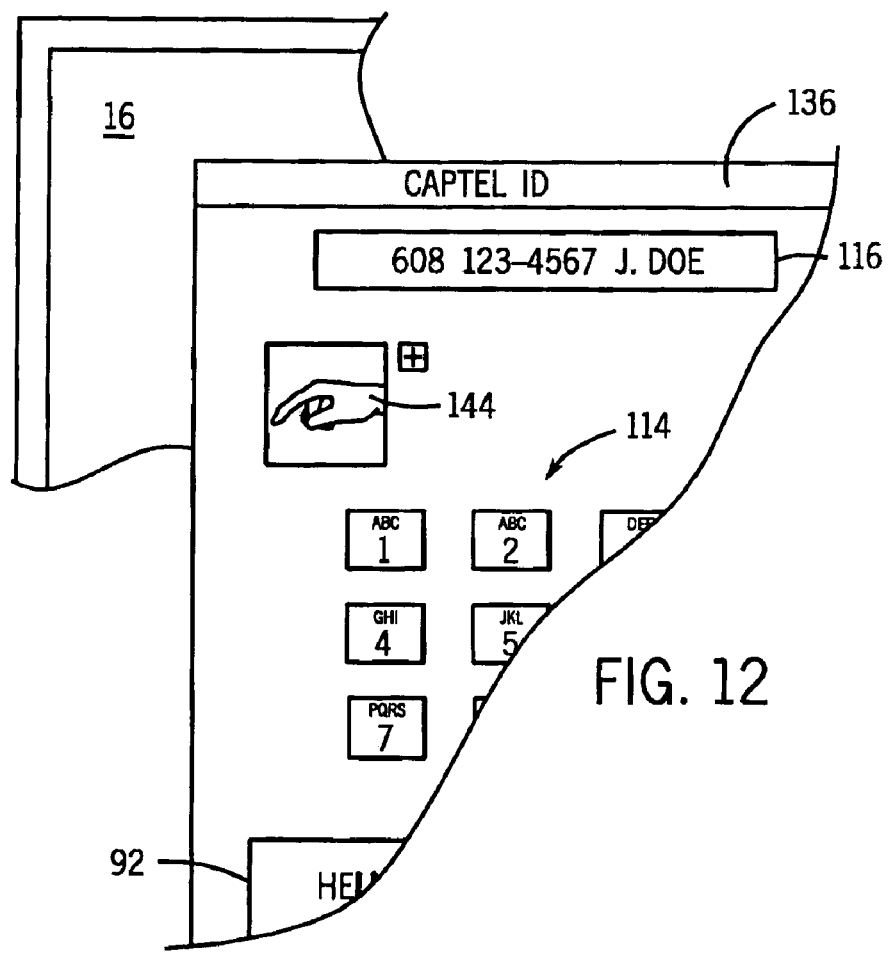
FIG. 12 is a fragmentary view of the caller interface window of FIG. 9 showing a video inset possible with the configuration of FIG. 11.

General purpose Internet appliances such as computer 14 make it possible to expand the previous embodiments to the addition of a video camera 140 providing video signals 142 to the Internet as well as the VOIP signals 52 and the receipt of captioning text 55. Referring to FIG. 12, the addition of video signals allows a video inset box 144 to be added to the caller interface window 136, allowing viewing of the other party to the conversation or the relay operator also having an Internet appliance such as a computer 14. This embodiment allows face-to-face conversations, but also may allow, for example, the use of American Sign Language or lip reading between users together with the captioning provided by the text box 92. In other respects, the caller interface window 136 may be identical to caller interface window 110 described above.

In a variation on this embodiment, a standard videophone may be used as may be connected over a broadband Internet connection (or corporate LAN) to provide video and voice. Videophones are popular with both hearing people and deaf people that use sign language and provide a built in camera and display screen for the picture of the other party.

In this embodiment, the videophone user or video conference system user can connect with the captioning service website and the service can send the captions not as IP text but as an IP video signal formatted to be compatible with the videophone. The captions are transmitted instead of the image of the caller, as video images of letters using standard captioning software that converts text to a video signals or as overlaid on the image of one caller using a video merging technique. In the case where a videophone provides a separate text display, this can alternatively be used for the captioning, as described above with the Internet phone, with the text being transmitted as IP text, that is, character data such as ASCII or Baudot. Alternatively, IP text may be converted at the videophone into image data to be displayed on a video screen as a caption. When IP text is recieved, the videophone may elect how the text is to be displayed, either as captions on a video image or as text with no other image. The IP text may be uniquely marked to identify it to the videophone.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of providing captions to telephone callers using a combination of a telephone terminal and an Internet appliance comprising the steps of:
    (a) communicating, over a telephone network, a voice portion of a telephone call between a first caller and a second caller operating telephone terminals communicating with the telephone network;
    (b) the first caller actuating the Internet appliance to communicate over the Internet with a relay, thereby establishing a connection between the Internet appliance and the relay over the Internet:
    (c) routing the voice portion to a voice recognition engine at the relay, the voice recognition engine transcribing the voice portion to corresponding text;
    (d) communicating the text over the Internet; and
    (e) displaying the text on the Internet appliance to at least one of the first and second callers.

2. The method of claim 1 wherein the telephone network includes a PBX network.

3. The method of claim 1 wherein the relay receives the voice portion of the telephone call from the telephone network.

4. The method of claim 3 including the step of the first caller dialing the relay on the telephone network to provide the relay with a telephone number of the second caller, and the step of the relay calling the second caller to complete the telephone call.

5. The method of claim 1 including the step of the first caller contacting the relay to provide the relay with a telephone number of the first caller and a telephone number of the second caller, and the step of the relay calling the first and second caller to complete the call.

6. The method of claim 1 wherein the relay receives the voice portion of the telephone call from the Internet in voice over Internet protocol.

7. The method of claim 6 including the step of tapping into a handset of one telephone terminal to communicate the voice portion of the telephone call to the Internet appliance for communication of the voice portion to the relay over the Internet.

8. The method of claim 1 wherein the Internet appliance further transmits a video signal of the first caller over the Internet.

9. The method of claim 1 wherein the telephone network is selected from the group consisting of a telephone land line, a cellular telephone link, and a voice over Internet protocol (IP) connection.

10. The method of claim 1 wherein the telephone network receives a standard telephone number to connect the first and second caller.

11. A telephone call captioning system comprising:
    a first and second telephone terminal communicating over a telephone network to convey a voice portion of a telephone call between a first caller and a second caller operating the telephone terminals;
    a relay receiving the voice portion and providing a computer executed speech recognition engine transcribing the voice portion to corresponding text; and
    an Internet appliance actuated by one of the first and second callers to communicate over the Internet with the relay to establish a connection between the Internet appliance and the relay over the Internet, and communicating over the Internet to display the text to at least one of the first and second callers.

12. The captioning system of claim 11 wherein the telephone network includes a PBX network.

13. The captioning system of claim 11 wherein the relay communicates with the telephone network to receive the voice portion of the telephone call from the telephone network.

14. The captioning system of claim 13 wherein the relay operates to receive a telephone number of the second caller from the first caller dialing the relay on the telephone network, and calling the second caller to complete the telephone call.

15. The captioning system of claim 11 wherein the relay receives the voice portion of the telephone call from the Internet in voice over Internet protocol.

16. The captioning system of claim 15 further including a tap connecting a handset of one telephone terminal to the Internet appliance to communicate the voice portion of the telephone call to the Internet appliance for communication of the voice portion to the relay over the Internet.

17. The captioning system of claim 11 wherein the Internet appliance further includes a camera transmitting a video signal of one of the first and second callers to the relay over the Internet.

18. The captioning system of claim 17 wherein the text is provided as a signal selected from the group consisting of: a video signal and a text signal.

19. The captioning system of claim 11 wherein the telephone network is selected from the group consisting of a telephone land line, a cellular telephone link, and a voice over Internet protocol (IP) connection.

20. The captioning system of claim 11 wherein the telephone network receives a standard telephone number to connect the first and second caller.

21. A relay for telephone call captioning comprising:
    a first connection for receiving at least a voice portion of a telephone call between a first caller and a second caller operating telephone terminals communicating with a telephone network;
    a computer executed speech recognition engine operating to transcribe at least a portion of the voice portion of the telephone call to text; and
    a second connection conveying the text over the Internet to an Internet appliance viewable by one of the first and second callers, wherein the second connection is established over the Internet by one of the first and second callers actuating the Internet appliance to communicate over the Internet with the relay to establish the second connection between the Internet appliance and the relay.

22. The relay of claim 21 wherein at least one of the telephone terminals and Internet appliance are provided by a single cellular telephone.

23. A captioning method providing captions to callers communicating over the Internet comprising the steps of:
communicating a voice portion of a telephone call between a first caller and a second caller, at least the first caller operating an Internet telephone using a voice over Internet protocol;
actuating the Internet telephone to communicate over the Internet with a relay to establish a connection between the Internet telephone and the relay over the Internet;
communicating a text captioning of the telephone call between the first caller and the second caller to the Internet telephone communicating over the Internet with the relay, the relay providing a speech recognition engine transcribing the voice portion to text captioning.

24. The method of claim 23 wherein the Internet telephone is a computer communicating with the Internet.

25. The method of claim 23 wherein the Internet telephone is a dedicated VOIP telephone, and the text captioning is displayed on a VOIP telephone display.

26. The method of claim 23 including the step of accepting an input from the first caller to initiate communicating the text captioning of the telephone call between the first caller and the second caller.

27. The method of claim 23 wherein the caller initiates the text captioning by activating a control button.

28. The method of claim 23 including the step of displaying a volume of the telephone call to at least one of the first and second callers.

29. The method of claim 23 wherein the Internet telephone further includes a serial number, and including the step of transmitting the serial number to the relay to validate the first caller.

30. The method of claim 23 wherein the Internet telephone further includes a telephone network connection, and including the step of communicating the voice portion of the telephone call between the first caller and the second caller over the telephone network connection when a telephone number of the second caller is a public emergency number.

31. The method of claim 23 wherein the Internet telephone further transmits a video signal of the first caller to the relay over the Internet.

32. The method of claim 23 wherein the text captioning is received as an IP video signal.

33. The method of claim 23 wherein the voice portion is only one of the first caller and the second caller to preserve anonymity of the other of the first caller and the second caller.

34. A captioning system providing captions to callers communicating over the Internet comprising:
at least one Internet telephone communicating a voice portion of a telephone call between a first caller and a second caller using a voice over Internet protocol;
a relay providing a speech recognition engine and operating to communicate a text captioning of the telephone call to the at least one Internet telephone communicating over the Internet with a relay;
wherein the Internet telephone is actuated by one of the callers to communicate over the Internet with the relay to establish a connection between the Internet telephone and the relay over the Internet.

35. The captioning system of claim 34 wherein the Internet telephone is a computer communicating with the Internet.

36. The captioning system of claim 34 wherein the Internet telephone is a dedicated VOIP telephone and the text captioning is displayed on a VOIP telephone display.

37. The captioning system of claim 34 wherein the Internet telephone provides a caller control accepting an input from the first caller to initiate communicating the text captioning of the telephone call between the first caller and the second caller.

38. The captioning system of claim 37 wherein the caller control is a control button.

39. The captioning system of claim 34 wherein the Internet telephone provides a display displaying a volume of the telephone call.

40. The captioning system of claim 34 wherein the Internet telephone further includes a serial number, and wherein the Internet telephone transmits the serial number to the relay to validate at least one of the first caller and the second caller.

41. The captioning system of claim 34 wherein the at least one Internet telephone further includes a telephone network connection, and the at least one Internet telephone operates to communicate the voice portion of the telephone call between the first caller and the second caller over the telephone network connection when a telephone number of the second caller is a public emergency number.

42. The captioning system of claim 34 wherein the Internet telephone further transmits a video signal of the first caller to the relay over the Internet.

* * * * *